United States Patent [19]
Hostynek et al.

[11] 3,710,939
[45] Jan. 16, 1973

[54] FROTHING AGENTS FOR THE FLOATATION OF ORES

[75] Inventors: Juraj J. Hostynek, Midland, Mich.; Collins, David J., Walnut Creek, Calif.

[73] Assignee: The Dow Chemical Company, Midland, Mich.

[22] Filed: June 15, 1970

[21] Appl. No.: 46,498

[52] U.S. Cl. .................................................209/166
[51] Int. Cl. ................................................R03d 1/02
[58] Field of Search............209/166, 167; 260/615 B

[56] References Cited

UNITED STATES PATENTS

| | | | |
|---|---|---|---|
| 2,679,522 | 5/1954 | De Groote | 260/615 X |
| 2,965,678 | 12/1960 | Sundberg | 260/615 |
| 3,085,085 | 4/1963 | Wismer | 260/615 |
| 3,110,736 | 11/1963 | De Groote | 260/615 |
| 3,595,390 | 7/1971 | Booth | 209/166 |

*Primary Examiner*—Frank W. Lutter
*Assistant Examiner*—Robert Halper
*Attorney*—Griswold & Burdick, Herbert D. Knudsen and C. E. Rehberg

[57] ABSTRACT

Polyoxypropylene adducts of glycerine, hexanetriol, diglycerol, sorbitol, pentaerythritol, a monosaccharide, a disaccharide or mixture thereof having at least about 5 or more oxypropylene units and a molecular weight below about 2,100 have been discovered to be excellent frothing agents for the floatation of ores.

4 Claims, No Drawings

FROTHING AGENTS FOR THE FLOATATION OF ORES

BACKGROUND OF THE INVENTION

The flotation of an aqueous pulp of an ore by the use of frothing agents is well known, and a number of compositions are commercially available. Although pine oil and cresylic acids are generally regarded to be the traditional frothing agents, other frothing agents have been used. For example, Tveter in U. S. Pat. No. 2,611,485 teaches the use of lower alkyl and phenyl monoethers of propylene glycol and polypropylene glycols as suitable frothing agents, and Booth et al. in U. S. Pat. No. 2,695,101 teach the use of polypropylene glycol compounds having a molecular weight of about 140 to about 2,100.

SUMMARY OF THE INVENTION

According to the present invention, a polyoxypropylene adduct of glycerine, hexanetriol, diglycerol, sorbitol, pentaerythritol, a monosaccharide, a disaccharide or mixture thereof having at least about 5 or more oxypropylene units and having a molecular weight of below about 2,100 have been found to be excellent flotation agents for ores. These frothing agents give high ore recovery with less material than known compositions at economical costs.

The adducts of the present invention are easily prepared by conventional oxyalkylation reactions. In such reactions, the hydroxy initiator is reacted with propylene oxide in the presence of a suitable catalyst, such as sodium hydroxide. Thus, the compounds of the present invention would be prepared by reacting glycerine, hexanetriol, diglycerol, sorbitol, pentaerythritol, a monosaccharide or a disaccharide with at least 5 moles of propylene oxide per mole of the initiator. The monosaccharide initiators may suitably be any of the pentoses or hexoses, such as glucose, fructose and arabinose. The disaccharide initiators may suitably be maltose, cellobiose, lactose and sucrose.

The preferred polyoxyalkylene adducts are those of glycerine and sucrose. Of special interest in the invention are adducts having a molecular weight below about 1,300.

In application, frothing agents containing at least a substantial amount, preferably more than 40 percent, of a frother of the invention are utilized in the same manner as conventional frothing agents. When used in such operations, the polyoxypropylene adducts are effective producers of a strong froth possessing the physical properties required to support the mineral particles and permitting a clean separation from the gangue. As compared with the standard frothers, pine oil, cresylic acid, polyoxypropylene glycol monoalkyl ethers, polyoxypropylene glycol phenyl ethers and polyoxypropylene glycols, the frothers of the invention are capable of producing an equivalent froth with a materially smaller quantity of the frothing agent. Hence, they are markedly superior in specific frothing power. In the case of many ores, they show a greater selectivity, producing a richer concentrate with a lower content of gangue materials.

The adducts of the invention are not mineral collectors; their function in the flotation process is solely that of a frothing agent. As a result, they are used in conjunction with conventional mineral collectors, such as the various xanthates.

SPECIFIC EMBODIMENTS

Examples 1–4 and Comparative Examples A–C

A series of parallel tests were run on a copper sulfide ore derived from mines in South America containing 1.8 percent copper. 500 Grams of the ore were ground in a ball mill for 5 minutes at a pulp density of 67 percent solids with 0.168 pounds per ton of a thionocarbamate collector. The resultant grind was 62 percent minus 200 mesh. The pulp was then conditioned with sulfuric acid to a pH of 3.8 and the amount of frothing agent as noted in the table. Following conditioning, a concentrate was removed from a commercial laboratory flotation cell in 7 minutes of frothing. In each example, the frothing agent was employed in the amount required to give equal volumes of froth, thereby evaluating the effectiveness of the different frothers. The results of these examinations as compared to pine oil, methylisobutylcarbinol and Dowfroth 250 (representative of the frothing agents shown in U. S. Pat. No. 2,611,485) are shown in Table I.

TABLE I

Flotation of Copper Sulfide Ore

| Example | Frothing Agent Composition[1] | Lbs./Ton | Concentrate %Cu | %Fe | % Recovery CU | Fe |
|---|---|---|---|---|---|---|
| 1 | Glycerine + 6 PO | 0.230 | 13.3 | 24.0 | 89.5 | 45.0 |
| 2 | Glycerine + 10 PO | 0.156 | 15.3 | 26.9 | 88.4 | 44.5 |
| 3 | Sucrose + 16 PO | 0.125 | 18.3 | 20.6 | 89.5 | 45.5 |
| 4 | Sucrose + 8 PO | 0.139 | 14.8 | 17.7 | 90.1 | 45.4 |
| Comp. A | Pine Oil | 0.738 | 14.6 | 17.2 | 88.7 | 44.6 |
| Comp. B | Methyl isobutyl carbinol | 0.383 | 15.1 | 17.4 | 88.6 | 42.8 |
| Comp. C | Dowfroth 250 | 0.263 | 15.2 | 17.7 | 89.3 | 45.1 |

1. PO = Oxypropylene units

Examples 5–8 and Comparative Example D

A series of parallel tests were run on a different sample of copper sulfide ore from the Southwestern United States by using the same procedure as the example above. The assayed head of the ore was 0.54 percent copper and the resultant grind was 62 percent minus 200 mesh. In the procedure for recovering the ore, 500 gram samples of the ore were ground in the ball mill for 3 minutes to a pulp density of 64 percent solids with 0.80 lbs./ton of lime to a pH of 10.5 and 0.063 lbs./ton of a thionocarbamate collector. The resultant grind was then conditioned for 1 minute with the required amount of frother to obtain equal volumes of froth as shown above and a concentrate was removed in 4 minutes of frothing. The results of these examinations are shown in Table II as compared to Dowfroth 250.

TABLE II

Flotation of Copper Sulfide Ore

| Example | Frothing Agent Composition[1] | Lbs./Ton | Concentrate %Cu | %Fe | % Recovery Cu | Fe |
|---|---|---|---|---|---|---|
| 5 | Glycerine + 6 PO | 0.190 | 17.6 | 18.6 | 79.8 | 28.7 |
| 6 | Glycerine + 10 PO | 0.146 | 21.2 | 20.5 | 79.6 | 26.5 |
| 7 | Sucrose + 16 PO | 0.128 | 16.1 | 27.3 | 84.7 | 47.6 |
| 8 | Sucrose + 8 PO | 0.120 | 14.5 | 24.2 | 85.2 | 50.1 |
| Comp. D | Dowfroth 250 | 0.202 | 14.3 | 23.9 | 83.6 | 48.7 |

1. PO = Oxypropylene units

In the same manner as shown by the examples above, other frothing agents are prepared by reacting glycerine, hexanetriol, diglycerol, sorbitol, pentaerythritol, sucrose, glucose, maltose or fructose with 5 to 35 moles of propylene oxide per mole of initiator. These frothing agents may then be used alone, in mixtures or in combination with other known frothing agents, such as Dowfroth 250 and those disclosed in the Background of the Invention. Also, in the same manner as shown for the copper ores in the examples, the frothing agents may be applied to the flotation of other ores, such as zinc ores and lead ores.

We claim:

1. In the concentration of ores by subjecting an aqueous slurry of the ore to froth flotation in the presence of a collector and a frother, the improvement of using an effective amount as a frothing agent of a polyoxypropylene adduct of glycerine, hexanetriol, diglycerol, sorbitol, pentaerythritol, a monosaccharide, a disaccharide or mixture thereof having at least 5 oxypropylene units per molecule and a molecular weight below about 2,100 and collecting a concentrate of said ore in the froth.

2. The process of claim 1 wherein the frothing agent is a polyoxypropylene adduct of glycerine, sucrose or mixture thereof.

3. The process of claim 2 wherein the ore is a copper, lead, or zinc ore.

4. The process of claim 3 wherein the ore is a copper sulfide ore.

* * * * *